United States Patent
Sethi et al.

(10) Patent No.: US 10,658,861 B2
(45) Date of Patent: May 19, 2020

(54) SYSTEM AND METHOD FOR MANAGING A RECHARGEABLE BATTERY BASED ON HISTORICAL CHARGING DATA

(71) Applicant: Dell Products L. P., Round Rock, TX (US)

(72) Inventors: Parminder Singh Sethi, Ludhiana (IN); Bhuvaneswari Tamilchelvan, Potong Pasir (SG); Lakshmi Narashimhan MC, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 19 days.

(21) Appl. No.: 15/974,761

(22) Filed: May 9, 2018

(65) Prior Publication Data

US 2019/0348851 A1 Nov. 14, 2019

(51) Int. Cl.
*H02J 7/00* (2006.01)
*H01M 10/42* (2006.01)

(52) U.S. Cl.
CPC ........... *H02J 7/0077* (2013.01); *H02J 7/00* (2013.01); *H02J 7/0022* (2013.01); *H01M 10/4257* (2013.01); *H02J 7/00034* (2020.01); *H02J 7/0048* (2020.01)

(58) Field of Classification Search
CPC .................................................... H02J 7/0073
See application file for complete search history.

(56) References Cited

U.S. PATENT DOCUMENTS

| | | | |
|---|---|---|---|
| 2011/0018679 A1* | 1/2011 | Davis | H02J 7/025 340/3.1 |
| 2014/0195826 A1* | 7/2014 | Wojcik | H05K 5/0086 713/300 |

* cited by examiner

*Primary Examiner* — David V Henze-Gongola
(74) *Attorney, Agent, or Firm* — Campbell Stephenson LLP; Shiv S. Naimpally

(57) ABSTRACT

Rechargeable batteries come in many different shapes and sizes. A rechargeable battery typically contains a group of one or more electrochemical cells. These cells degrade over time and use. Disclosed is a system and method for managing a rechargeable battery based on historical charging data. In one embodiment, the method includes storing a $1^{st}$ timestamp in memory of a mobile information handling system, wherein the $1^{st}$ timestamp identifies a time of day in which a $1^{st}$ cycle for charging a battery started. A $2^{nd}$ timestamp is also stored in the memory, wherein the $2^{nd}$ timestamp identifies a time of day in which a $2^{nd}$ cycle for charging the battery started. Thereafter an integer N based is generated on the $1^{st}$ and $2^{nd}$ timestamps, wherein N defines a recommended number of consecutive day(s) for charging the battery.

20 Claims, 5 Drawing Sheets

SYSTEM AND METHOD FOR MANAGING A RECHARGEABLE BATTERY BASED ON HISTORICAL CHARGING DATA

BACKGROUND OF THE INVENTION

An information handling system processes, compiles, stores, and/or communicates information for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information. Information handling systems can also implement various virtualized architectures. Data and voice communications among information handling systems can occur via networks that are wired, wireless, or some combination.

SUMMARY

Rechargeable batteries are used in mobile information handling systems such as laptop computers. Rechargeable batteries come in many different shapes and sizes. A rechargeable battery typically contains a group of one or more electrochemical cells. These cells degrade with time and use. Disclosed is a system and method for managing a rechargeable battery in the mobile information handling system based on historical charging data and/or discharging data. In one embodiment, the method includes storing a $1^{st}$ timestamp in memory of the mobile information handling system wherein the $1^{st}$ timestamp identifies a time of day in which a $1^{st}$ cycle for charging a battery started. A $2^{nd}$ timestamp is also stored in the memory, wherein the $2^{nd}$ timestamp identifies a time of day in which a $2^{nd}$ cycle for charging the battery started. Thereafter an integer N based is generated on the $1^{st}$ and $2^{nd}$ timestamps, wherein N defines a recommended number of consecutive day(s) for charging the battery. In another embodiment, the charge level on the battery is measured at fixed time intervals between charging cycles. The measured charge levels can be stored in memory of the mobile information handling system along with the $1^{st}$ and $2^{nd}$ timestamps. In this other embodiment, the measured charge levels can processed with the $1^{st}$ and $2^{nd}$ timestamps, to generate a recommendation for the next charging cycle.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION

The following description in combination with the Figures is provided to assist in understanding the technology disclosed herein. The description is focused on specific implementations and embodiments of the technology, and is provided to assist in understanding the technology. This focus should not be interpreted as a limitation on the scope or applicability of the technology.

An information handling system may take form in a laptop computer system, desktop computer system, server computer system, smart phone, data storage system, etc. The present technology will be described with reference to mobile information handling systems (e.g., laptop computers), or devices that are powered by internal rechargeable battery packs. As its name implies, rechargeable battery packs contain rechargeable batteries or batteries that can be charged and discharged numerous times. Rechargeable batteries come in many different shapes and sizes. A rechargeable battery typically contains a group of one or more electrochemical cells. Chemicals commonly used in the electrochemical cells include: lead-acid, nickel cadmium (NiCd), nickel metal hydride (NiMH), lithium ion (Li-ion), and lithium ion polymer (Li-ion). The present technology will be described with reference to rechargeable battery having one or more lithium-ion cells, it being understood the present invention should not be limited thereto.

Figure 1:
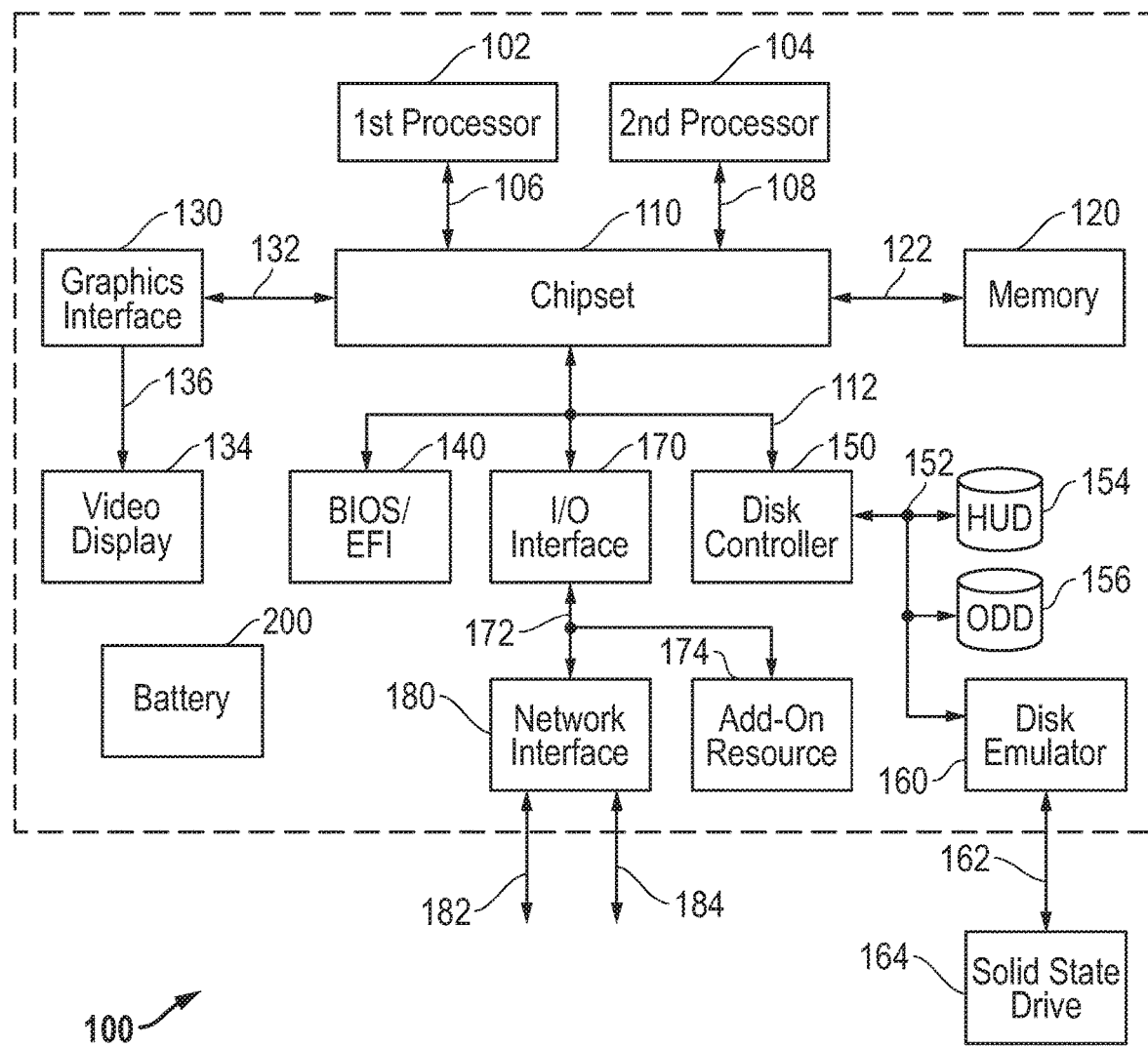
FIG. 1 is a block diagram illustrating an example mobile information handling system according to an embodiment of the present disclosure.

FIG. 1 illustrates an example embodiment of a mobile information handling system 100, which contains a rechargeable battery pack 200 that provides mobile power. Mobile information handling system 100 can include processing resources for executing machine-executable code, such as a central processing unit (CPU). The information handling system 100 can also include computer-readable memory for storing machine-executable code or data, such as data related to cycles for charging and discharging a battery within a rechargeable battery pack 200. Additional components of the mobile information handling system 100 can include one or more communications ports for communicating with external devices, and various input and output (I/O) devices, such as a keyboard and a video display. The mobile information handling system 100 can also include one or more buses operable to transmit information or data between the various hardware components.

The mobile information handling system 100 can include devices or modules that embody one or more of the devices or modules described above or below, and operates to perform one or more of the methods described herein. The mobile information handling system 100 includes one or more processors (e.g., processors 102 and 104), a chipset 110, a computer-readable 120, a graphics interface 130, a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, the mobile information handling system 100 includes separate memories that are dedicated to each of the processors 102 and 104 via separate memory interfaces. An example of the memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/EFI module 140 includes BIOS/EFI code operable to detect resources within mobile information handling system 100, to provide drivers for the resources, initialize the resources, and access the resources.

Disk controller 150 includes a disk interface 152 that connects the disk controller 150 to a hard disk drive (HDD) 154, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface. Disk emulator 160 permits a solid-state drive 164 to be connected to mobile information handling system 100 via an external interface 162. An example of external interface 162 includes a USB interface. Alternatively, solid-state drive 164 can be disposed within mobile information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within mobile information handling system 100, a device that is external to the mobile information handling system, or a combination thereof.

Network interface 180 represents a NIC disposed within the mobile information handling system 100, on a main circuit board of the mobile information handling system 100, integrated onto another component such as chipset 110, in another suitable location, or a combination thereof. Network interface device 180 includes network channels 182 and 184 that provide interfaces to devices that are external to mobile information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another mobile information handling system, a data storage system, another network, a grid management system, another suitable resource, or a combination thereof.

Exemplary embodiments may packetize messages or data. The mobile information handling system 100 may interface with the communications network (such as a local area network, a wide area network, and/or the Internet) via the network interface 180. Messages and data may be packetized into packets of data according to a packet protocol, such as the Internet Protocol. The packets of data contain bits or bytes of data describing the contents, or payload, of a message. A header of each packet of data may contain routing information identifying an origination address and/or a destination address. There are many different known packet protocols, and the Internet Protocol is widely used, so no detailed explanation is needed.

Rechargeable batteries have a finite life due to unwanted chemical or physical changes to, or the loss of, the active materials of which they are made. Without the unwanted chemical or physical changes, rechargeable batteries could last indefinitely over an infinite number of charge cycles, wherein the charge cycle is defined as the complete charging of the rechargeable battery. Unfortunately the unwanted chemical or physical changes to the active materials adversely affect the electrical performance of the rechargeable battery. As a result, an older battery cannot hold charge for a sustained period of time compared to a newer battery. From a user's perspective, this means that over time a mobile information handling system that originally operated for 12 to 15 hours between charging cycles, may only operate for about 6 to 8 hours, or less, between charging cycles.

Understandably, users become frustrated with their mobile information handling systems as the internal batteries degrade and lose ability to hold charge. Users could replace older batteries in their mobile information handling systems with newer batteries. Replacing a battery, however, is expensive and time-consuming. While battery replacement might be required eventually, Applicants above have unexpectedly discovered that managing the charging cycles based on data collected during past charging and/or discharging cycles can extend the useful life of rechargeable batteries. The historical charging and/or discharging data can be used to provide charging recommendations that enhances the operation of rechargeable batteries.

Applicants have unexpectedly discovered that batteries have "memory." This discovery was made after Applicants recorded charging and discharging data for a rechargeable battery within a mobile information handling system. The battery was charged to 100% capacity each day for a number of consecutive days. During each daily discharge cycle the mobile information handling system ran the same software applications without variation to ensure a consistent battery drain. Table 1 below shows battery data collected by Applicants during 25 consecutive days of monitoring the battery.

| | | | Charge Level | | | | |
|---|---|---|---|---|---|---|---|
| Day | Start Charge Cycle | Stop Charge Cycle | 6:00 AM | 10:00 AM | 2:00 PM | 6:00 PM | 10:00 PM |
| 1. | 11:00 PM | 5:30 AM | 99% | 90% | 68% | 40% | 23% |
| 2. | 11:00 PM | 5:30 AM | 100% | 92% | 73% | 42% | 19% |
| 3. | 11:00 PM | 5:30 AM | 100% | 87% | 74% | 42% | 21% |
| 4. | 11:00 PM | 5:30 AM | 99% | 90% | 64% | 36% | 12% |
| 5. | 11:00 PM | 5:30 AM | 100% | 89% | 69% | 45% | 23% |
| 6. | 11:00 PM | 5:30 AM | 100% | 94% | 67% | 39% | 11% |
| 7. | 11:00 PM | 5:30 AM | 99% | 90% | 70% | 48% | 24% |
| 8. | 11:00 PM | 5:30 AM | 99% | 92% | 74% | 42% | 13% |
| 9. | 11:00 PM | 5:30 AM | 100% | 91% | 76% | 47% | 22% |
| 10. | 11:00 PM | 5:30 AM | 99% | 89% | 80% | 54% | 26% |
| 11. | 11:00 PM | 5:30 AM | 100% | 86% | 67% | 37% | 18% |
| 12. | 10:30 AM | 12:00 PM | 14% | 6% | 90% | 46% | 29% |
| 13. | 10:30 AM | 12:00 PM | 17% | 9% | 89% | 48% | 31% |
| 14. | 10:30 AM | 12:00 PM | 24% | 15% | 90% | 54% | 36% |
| 15. | 10:30 AM | 12:00 PM | 29% | 19% | 90% | 58% | 40% |
| 16. | 10:30 AM | 12:00 PM | 40% | 21% | 92% | 66% | 51% |
| 17. | 10:30 AM | 12:00 PM | 40% | 17% | 87% | 70% | 52% |
| 18. | 10:30 AM | 12:00 PM | 42% | 16% | 89% | 70% | 50% |
| 19. | 10:30 AM | 12:00 PM | 39% | 17% | 91% | 68% | 51% |
| 20. | 10:30 AM | 12:00 PM | 37% | 18% | 90% | 71% | 49% |
| 21. | 10:30 AM | 12:00 PM | 38% | 18% | 88% | 70% | 48% |
| 22. | 11:00 PM | 5:30 AM | 100% | 67% | 46% | 32% | 18% |
| 23. | 11:00 PM | 5:30 AM | 98% | 74% | 52% | 43% | 23% |
| 24. | 11:00 PM | 5:30 AM | 99% | 81% | 75% | 46% | 21% |
| 25. | 11:00 PM | 5:30 AM | 99% | 91% | 80% | 60% | 23% |

The collected data includes battery charge levels expressed as a percentage of full capacity. As seen from the table the charge levels were recorded 5 times during each day. The table also shows that charging cycles varied in time and duration. For days 1 through 11 (hereinafter the $1^{st}$ set of days) the battery was charged to full capacity between 11:00 PM and 5:30 AM. For days 12 through 21 (hereinafter the $2^{nd}$ set of days) the battery was charged to full capacity between 10:30 AM and 12:00 PM. Lastly, for days 22 through 25 (hereinafter the $3^{rd}$ set of days) the rechargeable battery was charged to full capacity from 11:00 PM to 5:30 AM, which was the same time and duration for the charging cycle during days 1 through 11. During each of the discharging cycles, the mobile information handling system ran the same software applications without variation so that energy drain on the battery was consistent.

Figure 5:
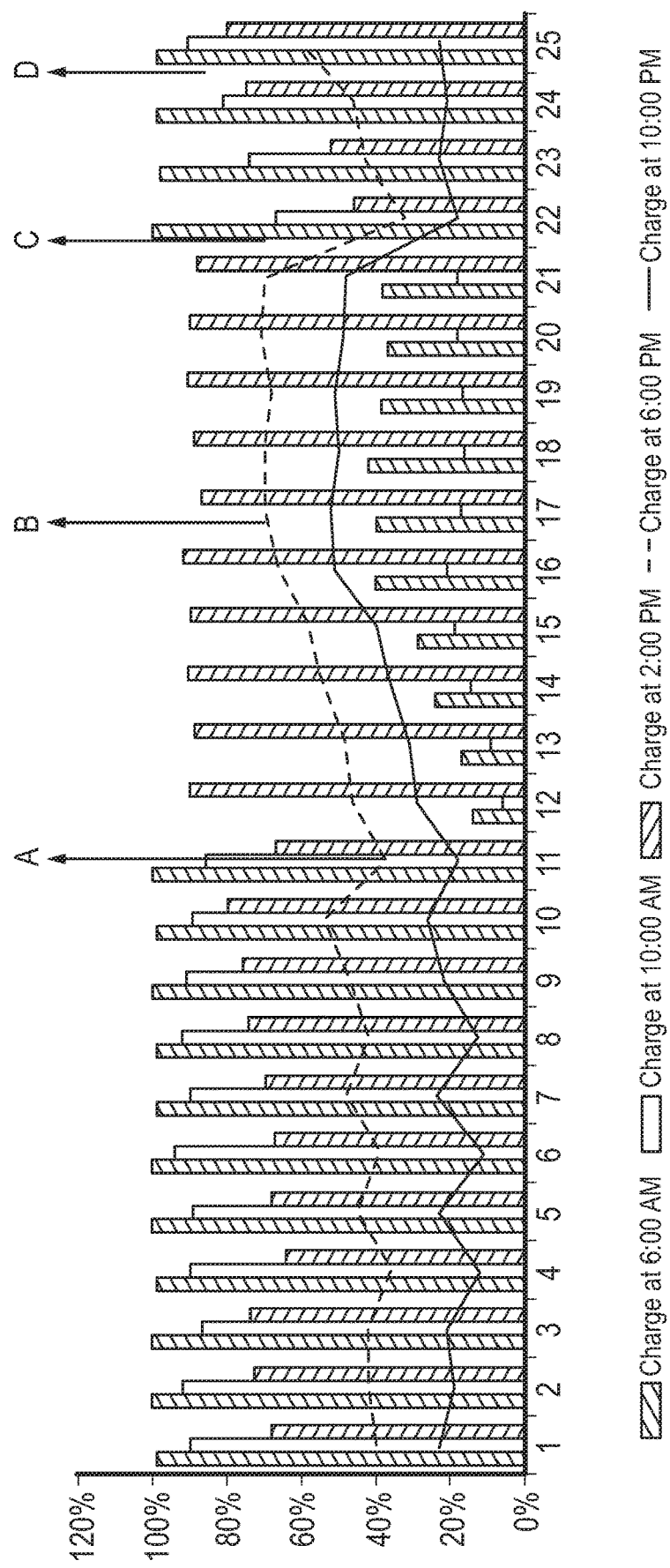
FIG. 5 illustrates a graphical representation of data recorded during a battery monitoring period.

Charge levels recorded during the discharge cycles of the $1^{st}$, $2^{nd}$, and $3^{rd}$ sets of days revealed unexpected results. In the $1^{st}$ set (i.e. days 1 through 11), the table shows that charge on the battery decreased on average 28% between 2:00 PM and 6:00 PM. In the $2^{nd}$ set of days, when the charge cycle occurred between 10:30 AM-12:00 PM, the data shows charge level decreased significantly between 2:00 PM and 6:00 PM on days 12 through 15. In particular, the charge level decrease on these days averaged around 38%, which is substantially more than the 28% average decrease that was seen during the $1^{st}$ set of days. However data for the $2^{nd}$ set of days also shows an average of 24% charge level decrease for days 16 to 21, a substantially lower rate when compared to days 12 through 15. The data for the $2^{nd}$ set also shows that the discharge pattern eventually reaches a steady state pattern in which there is little variance between 2:00 PM and 6:00 PM. For the $3^{rd}$ set of days, the charging cycle was returned to 11:00 PM-5:30 AM, which was the same charging cycle for the $1^{st}$ set of days. The data for the $3^{rd}$ set of days shows the charge level decreased on average of about 18% from 2:00 PM to 6:00 PM during days 22 through 25. It is further noted that the charge percentage at 2:00 PM and 6:00 PM on days 24 and 25 are very similar to the average charge percentages at 2:00 PM and 6:00 PM for the $1^{st}$ 11 days. FIG. 5 illustrates a graphical representation of the data contained within the table.

After changing the charging cycle for the $2^{nd}$ set of days, a considerable decrease in charge occurred between 2:00 and 6:00 PM for days 12 and 13, which indicates the battery attempts to return to its previous steady state discharge pattern. After day 13 the battery falls into a new and better discharge pattern. This data shows several days are needed to enable the battery to adapt to a new charging cycle. However at the end of the period for adaptation, there is more charge available to run applications on the mobile information handling system. The graph of FIG. 5 shows the slow increase\adoption that the battery takes between points A and B and then once again between points C and D. This data shows that an older battery need not be replaced immediately. Rather, by changing the charge/discharge patterns, the useful life of a battery can be extended.

The current technology exploits the unexpected result described above. More particularly, the current technology collects battery charging and/or discharging data, and uses this data to recommend a charging cycle time to the user, as will be more fully described below.

Figure 2:
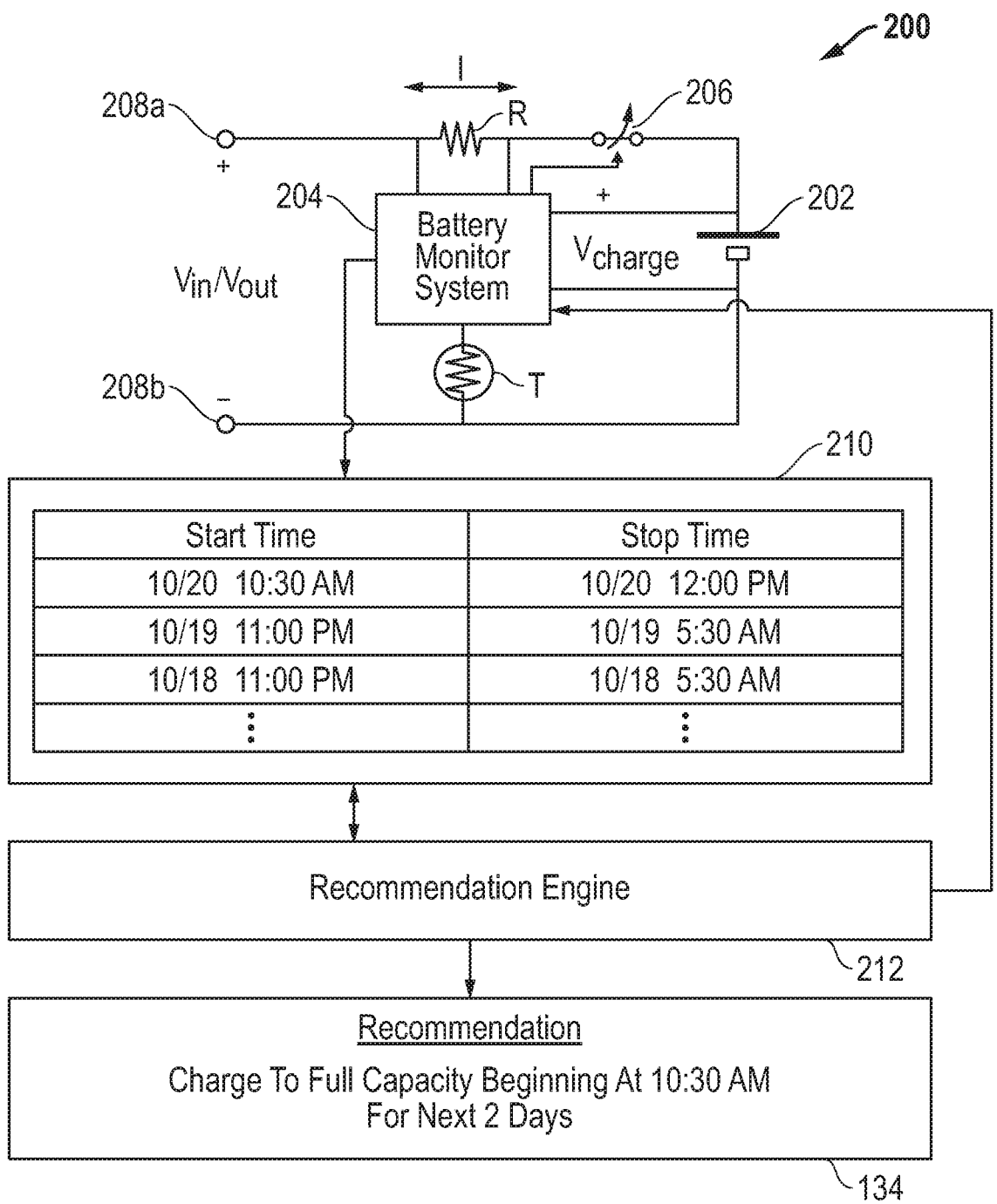
FIG. 2 illustrates relevant components of an example rechargeable battery pack employed in the mobile information handling system of FIG. 1.

As noted with reference to FIG. 1 mobile information handling system 100 includes rechargeable battery pack 200 that supplies power to various components (e.g., processors 102 and 104). With continuing reference to FIG. 1, FIG. 2 shows a more detailed view of rechargeable battery pack 200, which includes a rechargeable battery 202 and a battery monitoring system 204. The battery monitoring system 204 may take form in a microcontroller or a system-on-a-chip. For purposes of explanation only, the battery monitoring system 204 is presumed to take form in a microcontroller that includes a memory for storing instructions, and a central processing unit that executes the instructions stored in the memory. This enables the battery monitoring system to perform various functions as will be more fully described below. In addition to battery monitoring system 204 and battery 202, battery pack 200 includes a switch 206 controlled by battery monitoring system 204, terminals 208, a resistor R, and a thermistor T.

Battery monitoring system 204 can perform several functions. Battery monitoring system 204 can measure the voltage Vcharge across battery 202. Battery monitoring system 204 can measure current I flowing into or out of the battery 202 by measuring the voltage across resistor R. Battery monitoring system 24 can measure the temperature inside the battery pack 200 by measuring the voltage across thermistor T.

Battery pack 200 can operate in charge mode or a discharge mode. The charge mode begins when terminals 208 are electrically coupled to a charger (not shown). During the charge mode a charging voltage Vin is applied to terminals 208, and battery 202 is charged with current I. In the discharge mode current I flows from battery 202 to various components (e.g., processor 102) via terminals 208. Battery monitoring system 204 can determine the mode of operation based upon the polarity of the voltage across resistor R; if the voltage across resistor R is positive, battery pack 200 is in the charge mode, and if the voltage across resistor R is negative, the battery pack 200 is in the discharge mode as it supplies current I and Vcharge to terminals 208.

Figure 3:
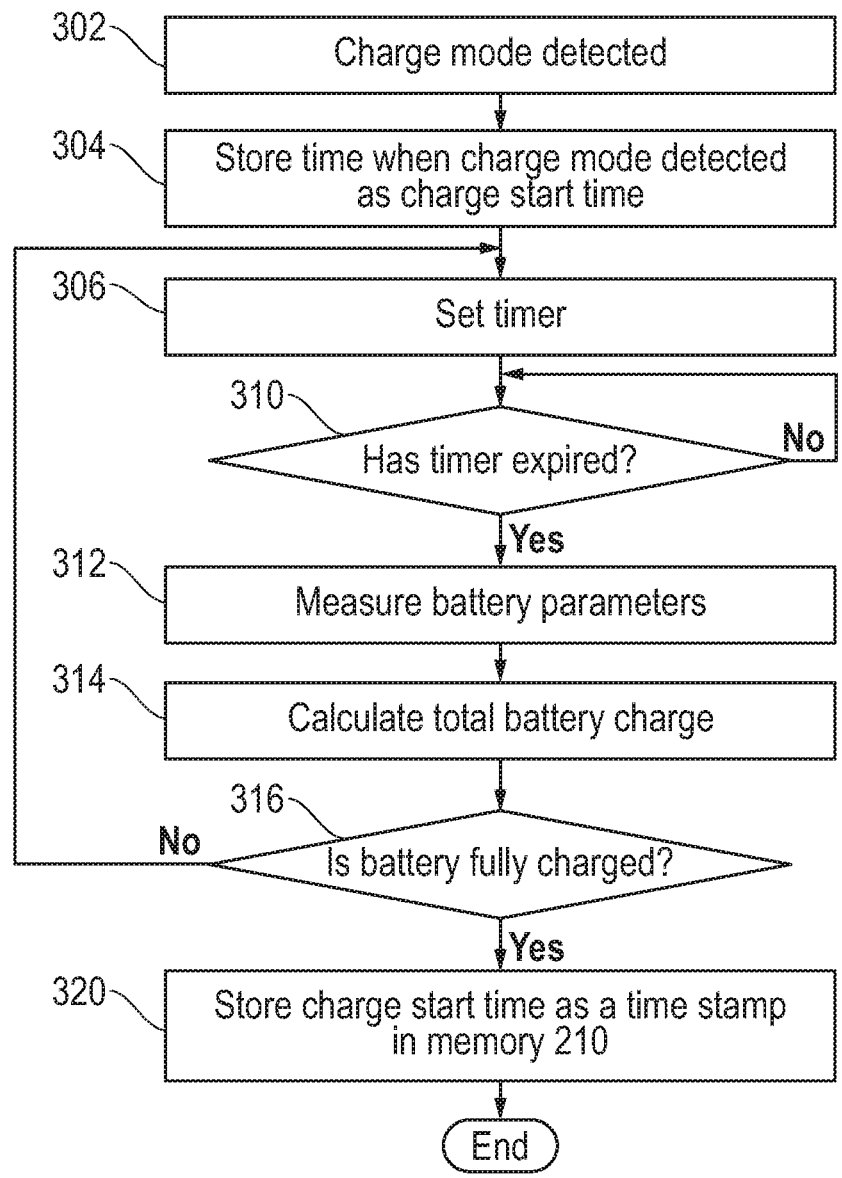
FIG. 3 is a flow chart illustrating relevant aspects of a method performed by an example battery monitoring system shown in FIG. 2.

Battery monitoring system 204 measures operational values (e.g., Vcharge, I and temperature). Battery monitoring system 204 or another component can use these measured values to calculate the charge level on battery 202 and to determine the mode of operation (charge or discharge) at any given time. FIG. 3 illustrates a process implemented by battery monitoring system 204 or another component, such as processor 102, in response to executing instructions stored in memory. For the purposes of explanation, it will be presumed that the process of FIG. 3 is implemented by the battery monitoring system 204. The process begins in step 302 when the battery monitoring system 204 detects when battery 202 has switched to charging mode. Battery monitoring system 204 can make this determination based on a change in polarity of voltage across resistor R. In step 304 battery monitoring system 204 records the start time or time when the charge mode was detected in step 304. In one embodiment, the battery monitoring system 204 maintains an internal clock. Step 304 can be implemented by copying the internal clock time to local memory (e.g., RAM) within battery monitoring system 204. The time copied to memory 210 in step 304, is referred to as the charging cycle start timestamp. Battery monitoring system 204 in the form of microcontroller, sets and initiates one of its dedicated hardware timers in step 306. The value within the timer increments with time as soon as the timer is initiated. Battery monitoring system 204 compares the timer value to a predetermined value. When the timer value equates to the predetermined value, or is greater than the predetermined value, the timer expires. In step 310 battery monitoring system 204 checks for timer expiration. If the timer has expired the process proceeds to step 312 where the battery monitoring system 204 measures battery parameters such as current I flowing through resistor R, temperature as indicated by the voltage across thermistor T, and voltage Vcharge across battery 202. Battery monitoring system 204 can store these measured parameters in local memory (RAM). Some or all parameters stored in memory (RAM), including parameters previously measured in accordance with step 312, can be used by battery monitoring system 204 or another component to calculate the charge level on battery 302 as shown in step 314. The charge level can be expressed as a percentage of total charge capacity for battery 202. At step 316 battery monitoring system 204 checks the calculated charge level against a predetermined value. If the calculated charge level is substantially equal to the predetermined value, the battery is considered fully charged. In an alternative embodiment battery monitoring system 204 determines that battery 202 is fully charged when current I flow into battery 202, as measured by the voltage across resistor R, is below a predetermined threshold, and the voltage Vcharge across battery 202 is about another predetermined threshold. When the battery is determined to be fully charged, battery monitoring system 204 copies the start timestamp to memory 210, and the process ends. It is noted that memory 210 can store several start timestamps, each one of which results from implementation of the process shown in FIG. 3. If the battery is judged not fully charged at step 316, the process returns to step 306 with a reset of the timer.

The battery monitoring system 204 can also calculate the charge level on battery 202 during the discharging cycles at fixed time intervals. Battery monitoring system 204 can make these calculations based on the same parameters mentioned above, including Vcharge, current I, temperature, etc. In addition to calculating the charge levels at fixed time intervals, battery monitoring system 204 can store these calculated levels in memory 210 along with timestamps when they were calculated.

Figure 4:
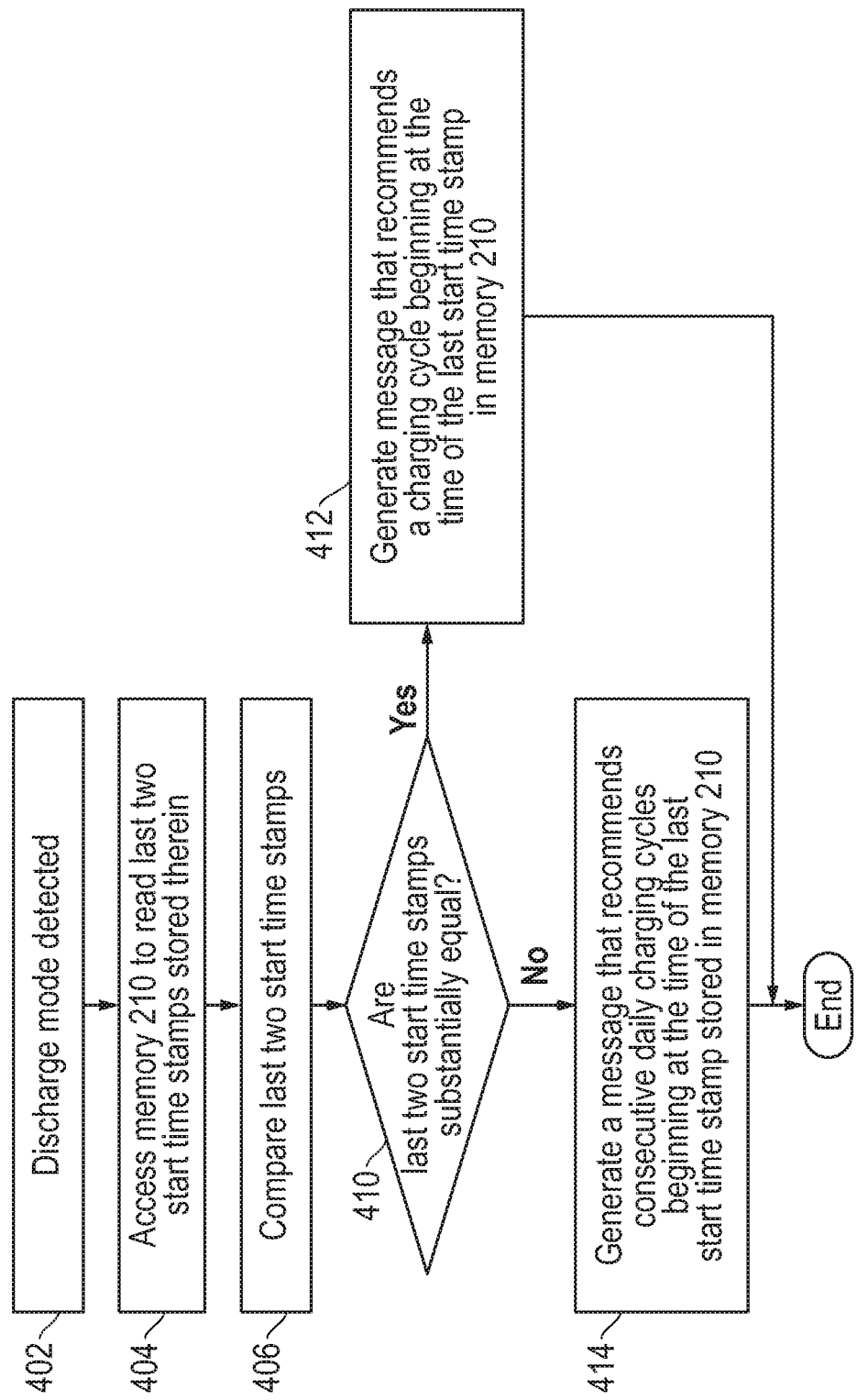
FIG. 4 is a flow chart illustrating relevant aspects of a method performed by an example recommendation engine shown in FIG. 2.

FIG. 2 shows a recommendation engine 212, which takes form in instructions executing on at least one of the processors 102 or 104 of mobile information processing system 100. Recommendation engine 212 has access to memory 210 and can process the data stored therein to generate a recommendation for charging battery 202. FIG. 4 illustrates a process implemented by recommendation engine 212 for generating a charge cycle recommendation in accordance with one embodiment of the technology.

Memory 210 holds charge cycle start timestamps stored therein in accordance with the implementation of the process shown in FIG. 3. Recommendation engine 212 can use these start timestamps, charging cycle stop timestamps and/or battery charge measurements that were recorded between charging cycles, to provide a recommendation to the user for charging battery 202 in a manner that extends the discharge cycle. FIG. 4 illustrates an example process implemented by recommendation engine 212. In one embodiment, the recommendation engine, including process shown in FIG. 4, takes form in instructions executing on a processor 102. The process shown in FIG. 4 begins when the discharge mode is detected in step 400. To this end, battery monitoring system 204 can detect a change in voltage polarity across resistor R, which indicates that current I flows out of battery 202. When this change is detected battery monitoring system 204 can generate a signal that is provided to the recommendation engine 212, which initiates the process shown in FIG. 4. Also, when the discharge mode is detected, recommendation engine can store in memory 210, a charging cycle stop timestamp or the time when the charging cycle has stopped and the discharging cycles has started. In one embodiment the stop timestamp is linked to the start timestamp most recently stored in memory 210. Recommendation engine 212 accesses memory 210 to read several timestamps stored therein. Recommendation engine 212 uses these timestamps to generate a battery charging cycle recommendation. Recommendation engine 212 can also generate the recommendation based upon discharge levels stored in memory 210. Ultimately, the recommendation includes a recommended start time for the next charging cycle. This recommendation may identify a number of one or more consecutive days in which the charge cycle should be started at the recommended start time. This recommendation may also include a time to stop the next charging cycle.

In the embodiment shown in FIG. 4, recommendation engine reads and processes the last 2 start timestamps entered into memory 210, it being understood the present invention should not be limited thereto. In other embodiments, recommendation engine reads and processes the last 3, 4, or more start timestamps entered into memory 210. The present invention will be described with reference to recommendation engine 212 reading and processing the last 2 start timestamps entered into memory 210, it being understood the present invention should not be limited thereto.

The recommendation engine 212 compares these 2 start timestamps in step 406. The recommendation engine 212 may also process in step 406, the charge levels stored in memory during discharge cycles. If these 2 start timestamps are substantially equal to each other (e.g., within 30 minutes of each other in one embodiment, less than 60 minutes in another embodiment), then recommendation engine 212 generates a message that recommends a start time for the next charging cycle. This recommended start time should equal the last start timestamp read from memory 210, which corresponds to the most recently completed charging cycle. If however the last 2 timestamps are not substantially, the recommendation engine generates a message that recommends the next two consecutive charge cycles start at the same time, which is the time of the last start timestamp read from memory 210, which corresponds to most to the most recently completed cycle. In an alternative embodiment, recommendation engine 212 can read and compare the last 2 start and stop timestamp pairs entered into memory 210. If the charging cycles defined by the start and stop timestamp pairs are substantially equal (e.g., 90% time overlap) the recommendation engine 210 generates a message that recommends that the next charge cycle start at the time defined by the start timestamp read from memory 210, which corresponds to the last charging cycle. Alternatively, If the charging cycles defined by the start and stop timestamp pairs are substantially equal (e.g., 90% time overlap) the recommendation engine 210 generates a message that recommends that the next charge cycle start and stop at the times defined by the start and stop times of the last timestamp pair read from memory 210, which corresponds to the last charging cycle. On the other hand, if the last 2 timestamp pairs are not substantially equal (e.g., less than 90 percent time overlap between the pairs), then the recommendation engine 210 generates a message that recommends consecutive daily charging cycles, with a start time equal to the time of the last start timestamp entered into memory 210. Alternatively, if the last 2 timestamp pairs are not substantially equal (e.g., less than 90 percent time overlap between the pairs), then the recommendation engine 210 generates a message that recommends consecutive daily charging cycles, with start and stop times equal to the times of the last pair of timestamps entered into memory 210. Thereafter, the process of FIG. 4 ends.

In one embodiment, recommendation engine 212 can generate the message in the form of an .xml or .json file. Messages can be stored in memory for subsequent display on display 134 (see FIG. 1) upon request by the user of the mobile information handling system. FIG. 2 illustrates an example recommendation message on display 134.

Battery monitoring system 204 is also capable of interrupting I by opening gate 206 if the user of the mobile information handling system attempts to start a charge cycle prior to the recommended start time indicated by the recommendation engine 212 for the next charge cycle. For example, battery monitoring system 204 can open switch 206 in response to a command from the recommendation engine if, for example, the user of mobile information handling system 100 attempts to charge battery 202 prior to the recommended time as. Moreover, battery monitoring system 204 can open gate 206 if battery monitoring system 204 determines that battery 202 has entered an unsafe mode of operation (e.g., the charge level has exceeded a safe limit, the temperature has exceeded a safe limit, etc.).

The process of FIG. 3, in an alternative embodiment, can be implemented by an information handling system (e.g., a server) in data communication with the mobile information handling system 100 via the Internet. In this embodiment, information handling system 100 can transmit to the server the 2 most recently entered charging cycle start and/or stop timestamps stored in memory 210. The server, which is not shown in the figures, can process these timestamps to generate a recommendation for the next charging cycle. The recommendation can be transmitted back to mobile information handling system 100 via the Internet, where it can be displayed at the user's request.

While a computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   storing a first most recent timestamp in a memory of a mobile information handling system, wherein the first most recent timestamp identifies a time of day in which a first most recently completed charging cycle for charging a battery started;
   storing a second most recent timestamp in the memory, wherein the second most recent timestamp identifies a time of day in which a second most recently completed charging cycle for charging the battery started;
   generating an integer N based on the first and second most recent timestamps, wherein N defines a recommended number of consecutive day(s) for charging the battery beginning at the time of day indicated by the first most recent timestamp.

2. The method of claim 1 further comprising:
   reading the first and second most recent timestamps from the memory;
   processing the first and second most recent timestamps read from the memory to generate N.

3. The method of claim 2, further comprising an act of generating a message that, when displayed, comprises a recommendation for charging the battery N consecutive day(s).

4. The method of claim 3, wherein the recommendation comprises a start time for charging the battery on each of the N consecutive day(s).

5. The method of claim 4, wherein one of the first and second most recent timestamps comprises the start time.

6. The method of claim 5, wherein processing the first and second most recent timestamps comprises comparing the first and second most recent timestamps, wherein N equals one if the first and second most recent timestamps are substantially equal, and wherein N is greater than 1 if the first and second most recent timestamps are substantially unequal.

7. The method of claim 1 further comprising:
storing a third timestamp in the memory, where the third timestamp identifies a time of day in which the first cycle ended;
storing a fourth timestamp in the memory, wherein the fourth timestamp identifies a time of day in which the second charge cycle ended.

8. The method of claim 4 further comprising:
detecting that current is flowing into the battery;
wherein the first most recent timestamp is stored in the memory in response to the detecting;
detecting that current is flowing out of the battery;
measuring charge levels on the battery at fixed time intervals;
storing the charge levels in memory;
wherein the message is generated based on the charge levels.

9. The method of claim 1 further comprising:
transmitting the first and second most recent timestamps to an information handling system;
wherein the information handling system performs the act of generating N;
transmitting N to the mobile information handling system for storage therein.

10. The method of claim 3, wherein the act of generating N is performed on the mobile information handling system, and wherein the method further comprises the mobile information handling system displaying the generated message.

11. A mobile information handling system comprising:
a rechargeable battery;
a first memory for storing processor executable instructions;
a second memory for storing data;
a processor for executing instructions stored in the first memory, wherein the processor executes the instructions stored in the first memory to perform first operations comprising:
storing a first most recent timestamp in the second memory, wherein the first most recent timestamp identifies a time of day in which a first most recently completed charging cycle for charging the battery started;
storing a second most recent timestamp in the second memory, wherein the second most recent timestamp identifies a time of day in which a second most recently completed charging cycle for charging the battery started;
generating an integer N based on the first and second most recent timestamps, wherein N defines a number of consecutive day(s) for charging the battery beginning at the time of day indicated by the first most recent timestamp.

12. The mobile information handling system of claim 11, wherein the first operations further comrpise:
reading the first and second most recent timestamps from the memory;
processing the first and second most recent timestamps read from the memory to generate N.

13. The mobile information handling system of claim 12, wherein the first operations further comprise:
generating a message that, when displayed, comprises a recommendation for charging the battery N consecutive day(s).

14. The mobile information handling system of claim 13, wherein the recommendation comprises a start time for charging the battery on each of the N consecutive day(s).

15. The mobile information handling system of claim 14, wherein one of the first and second most recent timestamps comprises the start time.

16. The mobile information handling system of claim 15, wherein the processing the first and second most recent timestamps comprises comparing the first and second most recent timestamps, wherein N equals one if the first and second timestamps are substantially equal, and wherein N is greater than one if the first and second most recent timestamps are substantially unequal.

17. The mobile information handling system of claim 13, wherein the first operations further comprise:
storing a third timestamp in the memory, where in the third timestamp identifies a time of day in which the first cycle ended;
storing a fourth timestamp in the memory, wherein the fourth timestamp identifies a time of day in which the second charge cycle ended.

18. The mobile information handling system of claim 13 further comprising:
a microcontroller comprising a processor, wherein the processor executes the instructions to perform second operations comprising:
detecting that current is flowing into the battery;
wherein the first most recent timestamp is stored in the memory in response to the detecting;
detecting that current is flowing out of the battery;
measuring charge levels on the battery at fixed time intervals;
storing the charge levels in memory;
wherein the message is generated based on the charge levels.

19. A mobile information handling system comprising:
a rechargeable battery;
means for storing first and second most recent timestamps in a memory, wherein the $1^{st}$ most recent timestamp identifies a time of day in which a first most recently completed charging cycle for charging the battery started, and wherein the second most recent timestamp identifies a time of day in which a second most recently completed charging cycle for charging the battery started;
means for generating an integer N based on the first and second most recent timestamps, wherein N defines a number of consecutive day(s) for charging the battery beginning at the time of day indicated by the first most recent timestamp.

20. The mobile information handling system of claim 19 wherein the means for generating comprises a means for comparing the first and second most recent timestamps, wherein N equals one if the 1 and second most recent timestamps are substantially equal, and wherein N is greater than 1 if the first and second most recent timestamps are substantially unequal.

* * * * *